(12) United States Patent
Saito et al.

(10) Patent No.: US 9,360,566 B2
(45) Date of Patent: Jun. 7, 2016

(54) RADIATION DETECTOR

(75) Inventors: Tatsuya Saito, Kawasaki (JP); Tatsuya Iwasaki, Machida (JP); Nobuhiro Yasui, Yokohama (JP); Toru Den, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 752 days.

(21) Appl. No.: 13/552,074

(22) Filed: Jul. 18, 2012

(65) Prior Publication Data

US 2013/0026374 A1    Jan. 31, 2013

(30) Foreign Application Priority Data

Jul. 26, 2011   (JP) ................... 2011-163111

(51) Int. Cl.
*G01T 1/20*   (2006.01)
*G01T 1/202*  (2006.01)
*G21K 4/00*   (2006.01)

(52) U.S. Cl.
CPC ............. *G01T 1/202* (2013.01); *G01T 1/2008* (2013.01); *G21K 4/00* (2013.01); *G21K 2004/04* (2013.01); *G21K 2004/06* (2013.01)

(58) Field of Classification Search
CPC ..... G01T 1/2008; G01T 1/202; G01T 1/2006; G21K 4/00; G21K 2004/04; G21K 2004/06; H01J 1/62; H01J 1/63; H01J 1/68; H01J 1/74; H01J 29/39; H01J 29/385; H01J 29/30; H01J 29/26
USPC ........................................................ 250/367
See application file for complete search history.

(56) References Cited

U.S. PATENT DOCUMENTS 3,825,787 A *  7/1974  Doolittle ................. 313/527
6,214,738 B1   4/2001  Aiba et al.
(Continued)

FOREIGN PATENT DOCUMENTS

JP    11-258351 A    9/1999
WO    2011/093176 A2  8/2011

OTHER PUBLICATIONS

RefractiveIndex.Info, "Refractive Index Database: CsI," Retrieved from internet <Nov. 16, 2014>, Retrieved from url <http:refractiveindex.info/?shelf=main&book=CsI&page=Li>.*

(Continued)

*Primary Examiner* — Yara B Green
(74) *Attorney, Agent, or Firm* — Fitzpatrick, Cella, Harper & Scinto

(57) ABSTRACT

Provided is a radiation detector, including: a two-dimensional light receiving element including a plurality of pixels; and a scintillator layer having multiple scintillator crystals two-dimensionally arranged on a light receiving surface of the two-dimensional light receiving element, in which: the scintillator crystal includes two crystal phases, which are a first crystal phase including a material including a plurality of columnar crystals extending in a direction perpendicular to the light receiving surface of the two-dimensional light receiving element and having a refractive index $n_1$, and a second crystal phase including a material existing between the plurality of columnar crystals and having a refractive index $n_2$; and a material having a refractive index $n_3$ is placed between adjacent scintillator crystals, the refractive index $n_3$ satisfying a relationship of one of $n_1 \leq n_3 \leq n_2$ and $n_2 \leq n_3 \leq n_1$.

20 Claims, 4 Drawing Sheets

(56) References Cited

U.S. PATENT DOCUMENTS

| | | | |
|---|---|---|---|
| 6,541,386 B2 | | 4/2003 | Aiba et al. |
| 8,586,931 B2 * | | 11/2013 | Horie et al. ............... 250/361 R |
| 2002/0056811 A1 * | | 5/2002 | Otto ........................ 250/370.11 |
| 2007/0075254 A1 * | | 4/2007 | Shoji et al. ............... 250/370.11 |
| 2011/0223323 A1 | | 9/2011 | Ohashi et al. |
| 2012/0248317 A1 | | 10/2012 | Ohashi et al. |
| 2012/0292516 A1 * | | 11/2012 | Yasui et al. ............... 250/361 R |

OTHER PUBLICATIONS

RefractiveIndex.Info, "Refractive Index Database: CsF, " Retrieved from internet <Nov. 16, 2014>, Retrieved from url <http:refractive index.info/?shelf=main&book=CsI&p.=Li>.*

Augerson, et al., "Controlling the Refractive Index of Epoxy Adhesives with Acceptable Yellowing After Aging," JAIC 1993, vol. 32, No. 3, Articl 8, pp. 311-314, Retrieved from internet {Nov. 16, 2014>, Retreived from url <www.hisglassworks.com/files/refraction.pdf>.*

Guan et al., "Preparation and Characterization of High Refractive Index Thin Films of TiO2/Epoxy Resin Nanocomposites," Journal of Applied Polymer Science, vol. 102, 1631-1636 (2006), Wiley Periodicals Inc. Retrieved from internet [Jul. 20, 2015]; Retrieved from url <onlinelibrary.wiley.com/doi/10.1002/app.23947/pdf>.*

* cited by examiner

RADIATION DETECTOR

BACKGROUND OF THE INVENTION

1. Field of the Invention

The present invention relates to a radiation detector using a scintillator, and more particularly, to a two-dimensional radiation detector which is referred to as a flat panel detector.

2. Description of the Related Art

In radiography which acquires an image by applying radiation to an object and detecting radiation which passes through the object, digital radiography (DR) which acquires an image by converting the detected radiation into an electric signal is popular. Generally, in DR, a flat panel detector (FPD) is used which includes a light receiving element having two-dimensionally arranged pixels and a scintillator layer placed on a light receiving surface of the light receiving element. Depending on the application, in most cases, a wide imaging area of several tens of centimeters or more per side is required for the FPD, and thus, the scintillator layer to be formed is required to have a large area. Therefore, the scintillator layer is formed by using vacuum deposition which enables formation of a large-area layer or an applying method of applying a binding agent having scintillator particles dispersed therein. In particular, a scintillator layer formed by vapor depositing cesium iodide has an advantage that, because cesium iodide is grown as needle crystals and so-called crosstalks are suppressed by a light guiding effect in the needle crystals, a high position resolution can be obtained. However, actually, adjacent needle crystals adhere to each other in places, and thus, in order to obtain a still higher position resolution, it is effective to cause the scintillator layer to have a greater extent of anisotropy in light propagation by causing the scintillator layer to have a structure in which two crystal phases having different refractive indices are completely separate from each other.

In order to manufacture such a scintillator layer including a structure in which two crystal phases having different refractive indices are completely separate from each other (phase separation structure), it is conceivable to employ a technology of micromachining a scintillator crystal, a technology of separating two phases of eutectic composition in one axial direction and growing the two phases, or the like. However, it is technically difficult to obtain by these technologies a phase separation structure having a large area of several tens of centimeters or more per side. In order to use a phase separation structure as a scintillator layer of an FPD, it is necessary to spread (tile) multiple phase separation structures processed to have a predetermined shape all over a surface of a light receiving element in order to secure a large imaging area. In this case, a problem is newly found that slight clearance which appears between adjacent phase separation structures due to limitations on the processing accuracy has a nonnegligible effect on a taken image. Specifically, a medium in the clearance which appears between phase separation structures is typically air (having a refractive index of 1.0), and thus, due to an effect of total reflection at an interface with a phase separation structure (tiling interface), the propagation characteristics of scintillation light generated in the phase separation structure locally change greatly. As a result, in pixels corresponding to the clearance between adjacent phase separation structures, the amount of incident scintillation light considerably reduces, and thus, the clearance between adjacent phase separation structures appears in the taken image as defects. Such defects are conspicuous when a large amount of scintillation light is generated at a location near a tiling interface. On the other hand, when a large amount of scintillation light is generated at a location far from the tiling interface, due to the great extent of anisotropy in light propagation of the phase separation structure, the amount of scintillation light which reaches the tiling interface is small, and thus, the defects are not conspicuous. In summary, when am object is actually imaged, bright portions and dark portions differ depending on each object, and thus, the effect of defects on the taken image differs accordingly. In order to perform calibration of such defects by image correction, a sophisticated correction technology is required with regard to each object.

SUMMARY OF THE INVENTION

In view of the above-mentioned problem, the present invention provides a radiation detector which is capable of suppressing, in an FPD having a scintillator layer formed therein by tiling phase separation structures having anisotropy in light propagation, the effect of clearance between adjacent phase separation structures on a taken image without making sophisticated image correction.

In order to solve the above-mentioned problem, according to one aspect of the present invention, there is provided a radiation detector, including: a two-dimensional light receiving element including a plurality of pixels; and a scintillator layer having multiple scintillator crystals two-dimensionally arranged on a light receiving surface of the two-dimensional light receiving element, in which: the multiple scintillator crystals each include two crystal phases, which are a first crystal phase including a material including a plurality of columnar crystals extending in a direction perpendicular to the light receiving surface of the two-dimensional light receiving element and having a refractive index $n_1$, and a second crystal phase including a material existing between the plurality of columnar crystals and having a refractive index $n_2$; and a material having a refractive index $n_3$ is placed between adjacent scintillator crystals of the multiple scintillator crystals, the refractive index $n_3$ satisfying a relationship of one of $n_1 \leq n_3 \leq n_2$ and $n_2 \leq n_3 \leq n_1$.

Further, according to another aspect of the present invention, there is provided a radiation detector, in which a crystal phase including a material having a higher refractive index of the two crystal phases, which are the first crystal phase and the second crystal phase together constituting the scintillator crystal functions as a scintillator.

Further, according to still another aspect of the present invention, there is provided a radiation detector, in which the first crystal phase is a crystal phase including NaCl as a main component and the second crystal phase is a crystal phase including CsI as a main component.

According to the present invention, in the FPD having the scintillator layer formed therein by tiling the phase separation structures having large anisotropy in light propagation, it is possible to suppress the effect of clearance between the adjacent phase separation structures on the taken image.

Further features of the present invention will become apparent from the following description of exemplary embodiments with reference to the attached drawings.

DESCRIPTION OF THE EMBODIMENTS

Figure 8:
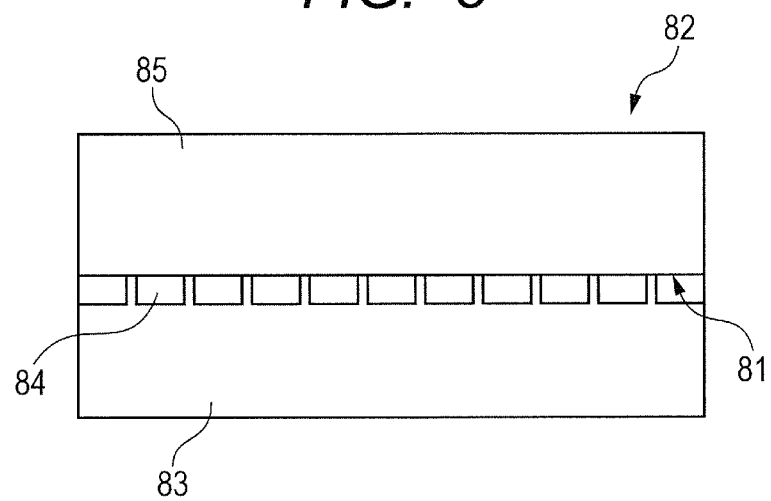
FIG. 8 is a schematic view of a radiation detector according to the present invention.

An embodiment for carrying out the present invention is described in the following with reference to the attached drawings. Note that, there are various embodiments for carrying out the present invention (various structures and various materials), but a point common to all the embodiments is that a scintillator crystal having a phase separation structure including two crystal phases, one crystal phase having a refractive index lower than that of the other crystal phase, has a first principal surface and a second principal surface which are not located on a same surface, the other crystal phase being exposed on part of the first principal surface and on part of the second principal surface, the part of the other crystal phase exposed on the first principal surface and the part of the other crystal phase exposed on the second principal surface being connected to each other. This causes light in a higher refractive index crystal phase to be totally reflected by a lower refractive index crystal phase located around the higher refractive index crystal phase, and as a result, to be guided and propagate through the higher refractive index crystal phase. During the propagation, the higher refractive index crystal phase is exposed on the first principal surface and the second principal surface, and these exposed portions are connected to each other, and thus, waveguiding (light guiding) is achieved toward the first principal surface or the second principal surface. In other words, it can be said that light generated in the scintillator crystal travels toward the first principal surface or the second principal surface under a state in which the light is confined in the other crystal phase having the higher refractive index (that is, without diffusion of the light). In this way, in all the embodiments of the present invention, the scintillator crystal itself has a waveguiding function (light guiding function). Note that, in this case, as illustrated in FIG. 8, for example, a first principal surface 81 is a surface which faces photodetectors 84 provided on a substrate 83, and a second principal surface 82 is a surface through which radiation such as X-rays enters. This enables waveguiding (light guiding) of light generated in a scintillator crystal 85 toward the photodetectors, and a scintillator crystal with an excellent efficiency in the use of light can be provided, and a radiation detector using the same having high luminance and high resolution can be provided.

Note that, in the embodiment described below, a structure is preferred in which the one crystal phase as the lower refractive index crystal phase also has a part exposed on the first principal surface and a part exposed on the second principal surface and the exposed parts are connected to each other. This enables waveguiding (light guiding) of light in the other crystal phase as the higher refractive index crystal phase to the first principal surface or the second principal surface to be achieved with more reliability and without diffusion of the light.

Further, a structure is preferred in which the one crystal phase as the lower refractive index crystal phase is located within the other crystal phase as the higher refractive index crystal phase. This can suppress the ratio occupied by the one crystal phase as the lower refractive index crystal phase in the scintillator crystal, and still, a sufficient waveguiding function (light guiding function) can be acquired.

Figure 1A:
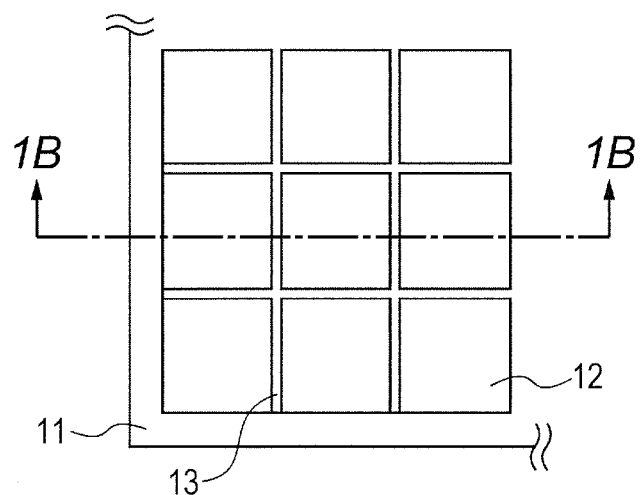
FIG. 1A is a schematic plan view of a radiation detector according to the present invention.
Figure 1B:
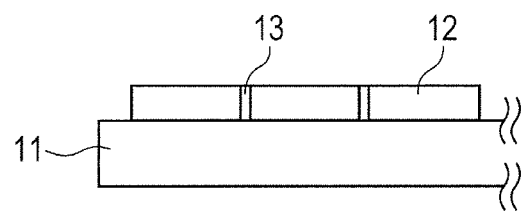
FIG. 1B is a sectional view taken along the line 1B-1B in FIG. 1A.

The embodiment of the present invention is described in the following. As illustrated in FIGS. 1A and 1B, in the radiation detector according to the present invention, a scintillator layer is formed by two-dimensionally arranging and tiling multiple scintillator crystals 12, which each have a phase separation structure, on a light receiving surface of a two-dimensional light receiving element 11 which includes a plurality of pixels.

Figure 2:
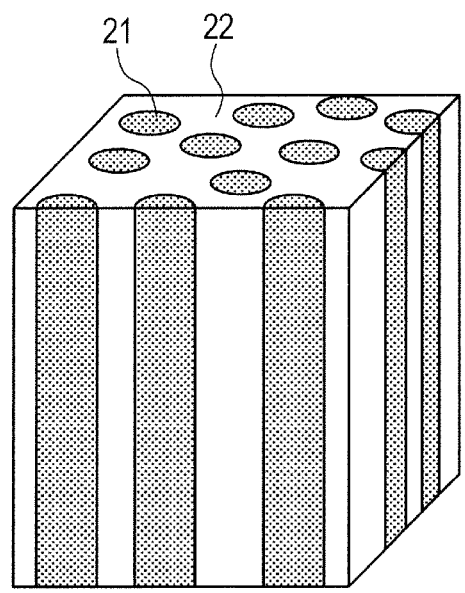
FIG. 2 is a schematic view illustrating an exemplary scintillator crystal having a phase separation structure.

FIG. 2 illustrates an exemplary structure of a scintillator crystal having a phase separation structure according to the present invention. FIG. 2 illustrates a scintillator crystal having a phase separation structure in which a first crystal phase (cylinders) 21 including a plurality of columnar crystals having unidirectionality and having a refractive index $n_1$ is formed in a second crystal phase (matrix) 22 having a refractive index $n_2$. Further, any one of the first crystal phase and the second crystal phase having the higher refractive index is formed of a scintillator material which emits light when being excited by radiation. Therefore, when $n_1 > n_2$, scintillation light is generated from the cylinders, and light is confined within and propagated through the cylinders by total reflection at the interfaces between the cylinders and the matrix, and thus, a great extent of anisotropy in light propagation develops in the direction of the cylinders. On the other hand, when $n_1 < n_2$, scintillation light is generated from the matrix, and total reflection occurs at the interfaces between the matrix and the cylinders. As a result, horizontal spread of light within the matrix is suppressed by the plurality of cylinders extending vertically when the light is propagated, and thus, anisotropy in light propagation develops although the extent of the anisotropy is smaller than that when light is confined within the cylinders.

The scintillator crystal including the phase separation structure as illustrated in FIG. 2 is manufactured by a technology of micromachining a scintillator crystal, a technology of separating two phases of eutectic composition in one axial direction and growing the two phases, or the like. It is technically difficult to obtain, by any one of these technologies, a scintillator crystal having a large area. Therefore, the radiation detector according to the present invention secures a large imaging area by tiling scintillator crystals processed to have a predetermined shape as illustrated in FIGS. 1A and 1B. In this case, by tiling the scintillator crystals 12 with a resin 13 having a refractive index $n_3$ provided between adjacent scintillator crystals 12, slight clearance which appears between the adjacent scintillator crystals 12 is filled with the resin 13 having the refractive index $n_3$. The medium to be provided between adjacent scintillator crystals 12 may be other than a resin insofar as the refractive index $n_3$ of the medium is between the refractive index $n_1$ of the first crystal phase and the refractive index $n_2$ of the second crystal phase and the medium does not absorb the scintillation light. A medium which does not absorb the scintillation light specifically means a medium having a transmittance that is similar to that of the crystal phase functioning as the scintillator of the first crystal phase and the second crystal phase.

As illustrated in FIGS. 1A and 1B, by providing the resin 13 having the refractive index $n_3$ between the adjacent scintillator crystals 12, compared with a case in which the resin is not provided therebetween, the difference in refractive index at the tiling interfaces becomes smaller. As a result, total reflection which occurs at the tiling interfaces reduces to suppress a local great change in propagation characteristics of the scintillation light. Specifically, an effect of the tiling on a taken image can be suppressed.

EXAMPLE 1

In this example, an effect of clearance between adjacent scintillator crystals on a taken image when scintillator crystals having a phase separation structure are tiled was estimated from a geometrical optic simulation.

Figure 3:
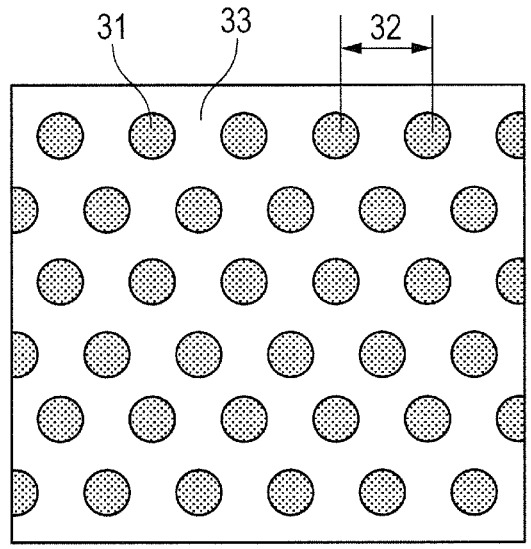
FIG. 3 is a schematic view of an NaCl—CsI phase separation scintillator crystal.
Figure 4A:
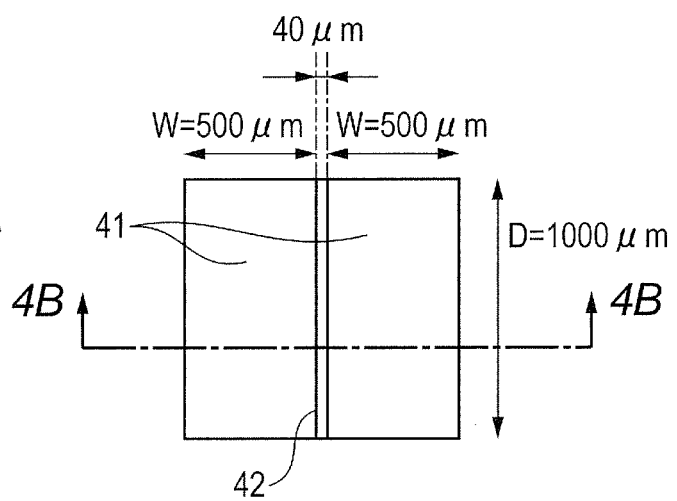
FIG. 4A is a plan view of a geometrical optic simulation model.
Figure 4B:
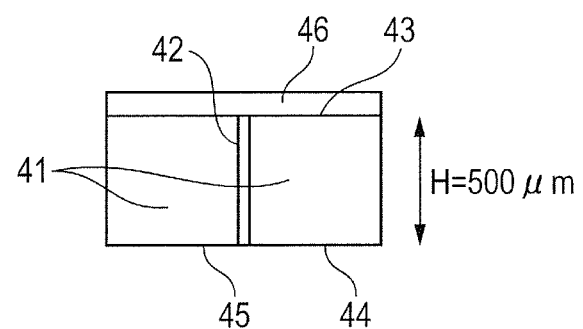
FIG. 4B is a sectional view taken along the line 4B-4B in FIG. 4A.
Figure 5:
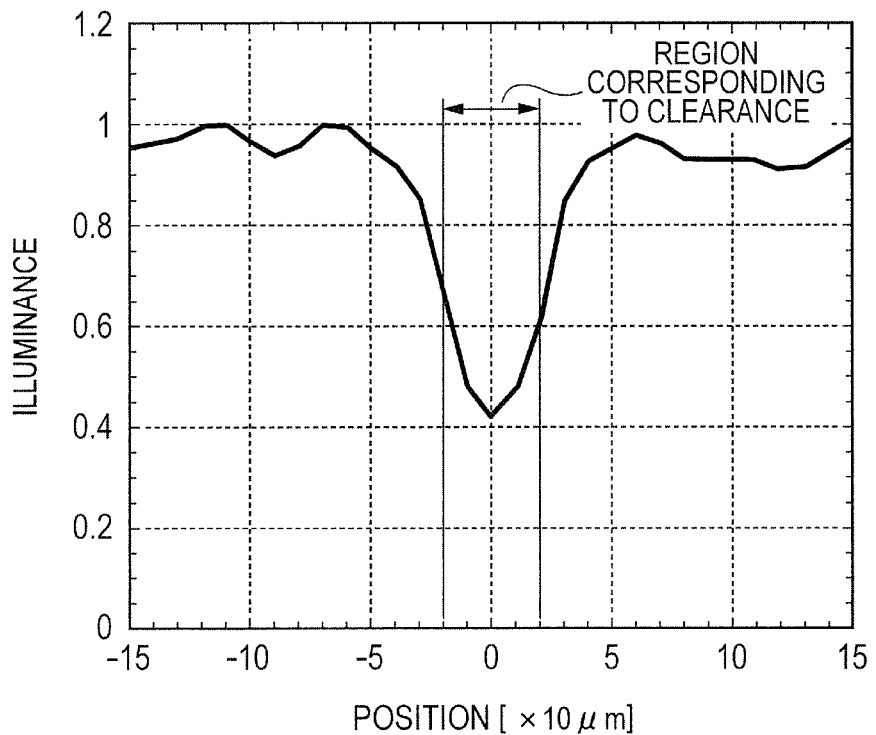
FIG. 5 is a graph showing linear illuminance distribution calculated from the geometrical optic simulation.
Figure 6:
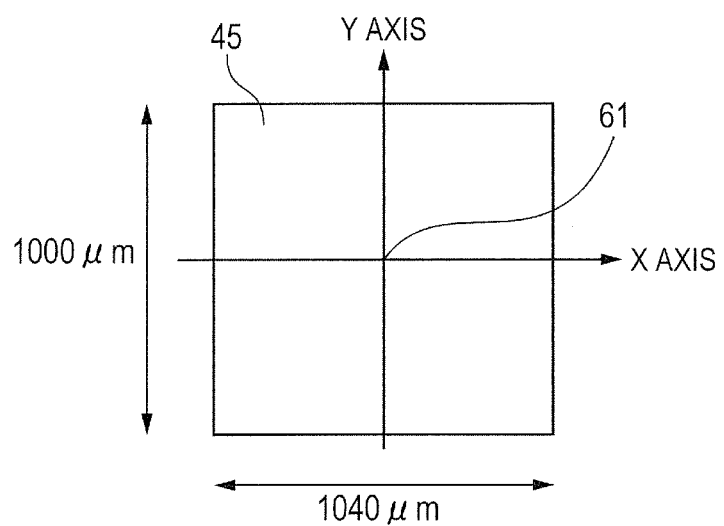
FIG. 6 is a schematic view of a light receiving surface.

In this example, calculation was performed with regard to an NaCl—CsI phase separation scintillator crystal including two crystal phases: a first crystal phase of NaCl (having a refractive index $n_1$ of 1.55); and a second crystal phase of CsI (having a refractive index of 1.78). Specifically, as illustrated in FIG. 3, in the structure of the scintillator crystal, NaCl portions 31 having a diameter of 2 μm were arranged to form a triangle lattice with a period 32 of 4 μm, and scintillation light was caused to be generated from CsI 33 as a matrix portion. Further, as illustrated in FIGS. 4A and 4B, two scintillator crystals 41 whose dimensions were W×D×H=500 μm×1,000 μm×500 μm were arranged with clearance 42 of 40 μm provided therebetween. Radiation entered from upper surfaces 43 of the scintillator crystals 41, and light receiving surfaces 45 provided on lower surfaces 44 were adapted to detect scintillation light. Further, a reflection plane 46 for reflecting the scintillation light was provided on the upper surfaces 43. The scintillation light was caused to be isotropically generated from the scintillator crystals 41. The light flux of the scintillation light was caused to have intensity distribution which decreases exponentially from the upper surfaces toward the lower surfaces taking into consideration of absorption of the radiation. FIG. 5 shows the result of calculation of illuminance distribution on the light receiving surfaces when the refractive index of the clearance 42 was 1.0 based on geometrical optics. FIG. 5 shows linear illuminance distribution when Y=0 (−150 μm≤x≤150 μm), in which the X axis and the Y axis were taken with the center of the light receiving surface 45 of 1,040 μm×1,000 μm being an origin 61 as shown in FIG. 6. In this case, the illuminance was calculated and plotted with regard to every region of 10 μm×10 μm when Y=0, and the data were normalized with respect to the maximum illuminance. From FIG. 5, it can be confirmed that, while the illuminance in regions other than the clearance 42 was almost constant, the illuminance of a region corresponding to the clearance 42 was considerably lowered, and that the amount of incident scintillation light was lowered by the effect of total reflection which occurred at the tiling interfaces. Further, (1-α), where α is the minimum illuminance in FIG. 5, is thought to be an index of the effect of the clearance between the scintillator crystals on the taken image (propagation loss). In the case shown in FIG. 5, (1-α) is 0.525=52.5%, and thus, the region corresponding to the clearance causes a propagation loss of 52.5% compared with the regions without the clearance.

Figure 7:
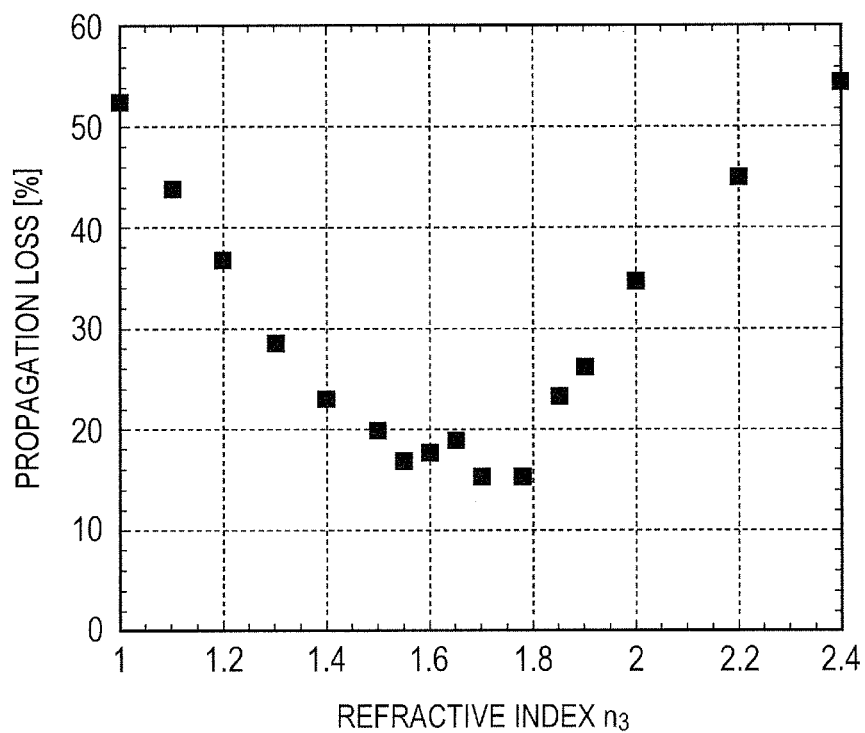
FIG. 7 is a graph showing a change in propagation loss in accordance with a refractive index $n_3$.

Next, the refractive index $n_3$ of the medium of the clearance 42 illustrated in FIGS. 4A and 4B was changed and calculation similar to the one described above was performed. FIG. 7 is a graph showing a change in propagation loss in accordance with the refractive index $n_3$. From FIG. 7, it can be confirmed that, while the propagation loss greatly changed in accordance with the refractive index $n_3$ of the medium of the clearance 42, generally when $1.55 \leq n_3 \leq 1.78$, the propagation loss was suppressed to be 20% or lower, and a great change in propagation loss did not occur in the region. Specifically, by tiling the NaCl—CsI phase separation scintillator crystals with a medium having the refractive index $n_3$ which satisfies $1.55 \leq n_3 \leq 1.78$ provided between adjacent NaCl—CsI phase separation scintillator crystals, the effect of the tiling on a taken image can be suppressed.

As a material having the refractive index $n_3$, for example, an epoxy resin (having a refractive index of 1.55 to 1.61), a melamine resin (having a refractive index of 1.6), a polystyrene resin (having a refractive index of 1.6), a vinylidene chloride resin (having a refractive index of 1.61), and a polycarbonate resin (having a refractive index of 1.59) can be used.

Further, in this example, calculation was performed with regard to an NaCl—CsI phase separation scintillator crystal, but the present invention is not limited to this example. Specifically, insofar as the medium having the refractive index $n_3$, the first crystal phase having the refractive index $n_1$, and the second crystal phase having the refractive index $n_2$ satisfy $n_1 \leq n_3 \leq n_2$ or $n_2 \leq n_3 \leq n_1$, even when a phase separation structure other than the NaCl—CsI phase separation scintillator is used, a similar effect can be obtained.

EXAMPLE 2

This example relates to imaging using the radiation detector according to the present invention.

First, an NaCl—CsI phase separation scintillator is manufactured which includes the first crystal phase whose main component is NaCl and the second crystal phase whose main component is CsI, the first crystal phase being columnar crystals having a diameter of 2 μm and an average period of 4 μm, the second crystal phase existing between the columnar crystals. Specifically, NaCl and CsI are mixed in composition at a eutectic point. After the mixture is heated and melted at 500° C., the mixture is cooled so as to solidify and to have unidirectionality. The acquired NaCl—CsI phase separation scintillator is cut and polished using a lapping sheet to prepare two NaCl—CsI phase separation scintillator crystals whose dimensions are W×D×H=5 mm×5 mm×500 μm. Then, the scintillator crystals are arranged side by side on a CCD sensor with 20-μm pixel pitches. Aluminum foil is placed on a surface which is opposite to a surface in contact with the CCD sensor. X-rays are applied from above the aluminum foil, and an image acquired from the CCD sensor is evaluated. Specifically, a taken image when an epoxy resin having a refractive index of 1.6 is provided between the scintillator crystals and a taken image when the epoxy resin is not provided between the scintillator crystals in a case where the two NaCl—CsI phase separation scintillator crystals are arranged side by side on the CCD sensor are compared with each other.

When the two taken images are compared, it is confirmed that, in the case of the taken image when the epoxy resin is not provided, luminance is considerably lowered in a linear region corresponding to the clearance between the two scintillator crystals. In other words, the clearance between the scintillator crystals which appears when the scintillator crystals are arranged side by side is thought to affect the taken image. On the other hand, when the epoxy resin is provided, a linear region in which the luminance is lowered is less conspicuous. It follows that, by filling the clearance between the scintillator crystals with the epoxy resin, the effect on the taken image is thought to be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-163111, filed Jul. 26, 2011, which is hereby incorporated by reference herein in its entirety.

What is claimed is:

1. A radiation detector, comprising:
   a scintillator layer having multiple scintillator crystals arranged in two dimensions; and
   a light receiving element including a plurality of pixels arranged in two dimensions for detecting scintillation light from the scintillator layer, wherein:
   the multiple scintillator crystals each comprise two crystal phases, which are:
   (i) a first crystal phase including a plurality of columnar crystals having unidirectionality and having a refractive index $n_1$, and
   (ii) a second crystal phase, which is between the plurality of columnar crystals and which has a refractive index $n_2$; and
   a material having a refractive index $n_3$ is disposed between adjacent said scintillator crystals, and the refractive indices $n_1$, $n_2$ and $n_3$ satisfy a relationship of one of $n_1 \leq n_3 \leq n_2$ and $n_2 \leq n_3 \leq n_1$.

2. The radiation detector according to claim 1, wherein a crystal phase having a higher refractive index of the first crystal phase and the second crystal phase functions as a scintillator.

3. The radiation detector according to claim 2, wherein the first crystal phase is a crystal phase comprising NaCl as a main component, and the second crystal phase is a crystal phase comprising CsI as a main component.

4. The radiation detector according to claim 1, wherein the scintillator crystal has a phase separation structure.

5. The radiation detector according to claim 4, wherein the phase separation structure of the multiple scintillator crystal comprises a structure in which the first crystal phase is formed in the second crystal phase.

6. The radiation detector according to claim 5, wherein any one of the first crystal phase and the second crystal phase having a higher refractive index comprises a scintillator material which emits light when being excited by radiation.

7. The radiation detector according to claim 4, wherein a material forming the first crystal phase and a material forming the second crystal phase are capable of forming a eutectic structure.

8. The radiation detector according to claim 4, wherein a material forming the first crystal phase and a material forming the second crystal phase are a eutectic composition.

9. The radiation detector according to claim 1, wherein the scintillator crystal has a phase separation structure including the two crystal phases, one crystal phase having a refractive index lower than a refractive index of another crystal phase, and has a first principal surface and a second principal surface which are not located on a same surface, the another crystal phase being exposed on part of the first principal surface and on part of the second principal surface, the part of the another crystal phase exposed on the first principal surface and the part of the another crystal phase exposed on the second principal surface being connected to each other.

10. The radiation detector according to claim 9, wherein the one crystal phase as a lower refractive index crystal phase of the two crystal phases also has a part exposed on the first principal surface and a part exposed on the second principal surface, and the exposed parts are connected to each other.

11. The radiation detector according to claim 9, wherein the one crystal phase as a lower refractive index crystal phase of the two crystal phases is located within the another crystal phase as a higher refractive index crystal phase.

12. The radiation detector according to claim 1, wherein the scintillator crystal has a waveguiding function.

13. The radiation detector according to claim 1, wherein the scintillator crystals are arranged in two dimensions by tiling multiple scintillator crystals processed to have a predetermined shape.

14. The radiation detector according to claim 1, wherein the material having the refractive index $n_3$ is selected from a group consisting of an epoxy resin, a melamine resin, a polystyrene resin, a vinylidene chloride resin, and a polycarbonate resin.

15. The radiation detector according to claim 1, wherein the scintillator crystal comprises NaCl—CsI phase separation structure scintillator crystal.

16. The radiation detector according to claim 1, wherein the light receiving element includes a plurality of detection regions for each of which illuminance is obtained, and wherein a width of the each of the plurality of detection regions is smaller than a clearance between the multiple scintillator crystals.

17. The radiation detector according to claim 16, wherein at least one of the plurality of detection regions does not overlap any of scintillators in a direction perpendicular to a light receiving surface and is covered with the material having the refractive index $n_3$.

18. The radiation detector according to claim 1,
   wherein the scintillator has a first surface and a second surface, which are not located on a same plane,
   wherein the first surface and the second surface each have a portion to which the second crystal phase is exposed, and
   wherein a portion exposed to the first surface and a portion exposed to the second surface of the second crystal phase are connected.

19. The radiation detector according to claim 1, wherein the plurality of columnar crystals extend in a direction perpendicular to a light receiving surface of the light receiving element.

20. The radiation detector according to claim 1, wherein the second crystal phase is filled between the plurality of columnar crystals.

* * * * *